Aug. 14, 1928.
J. W. GARDNER
1,680,870
LUBRICATING MECHANISM
Filed July 11, 1924
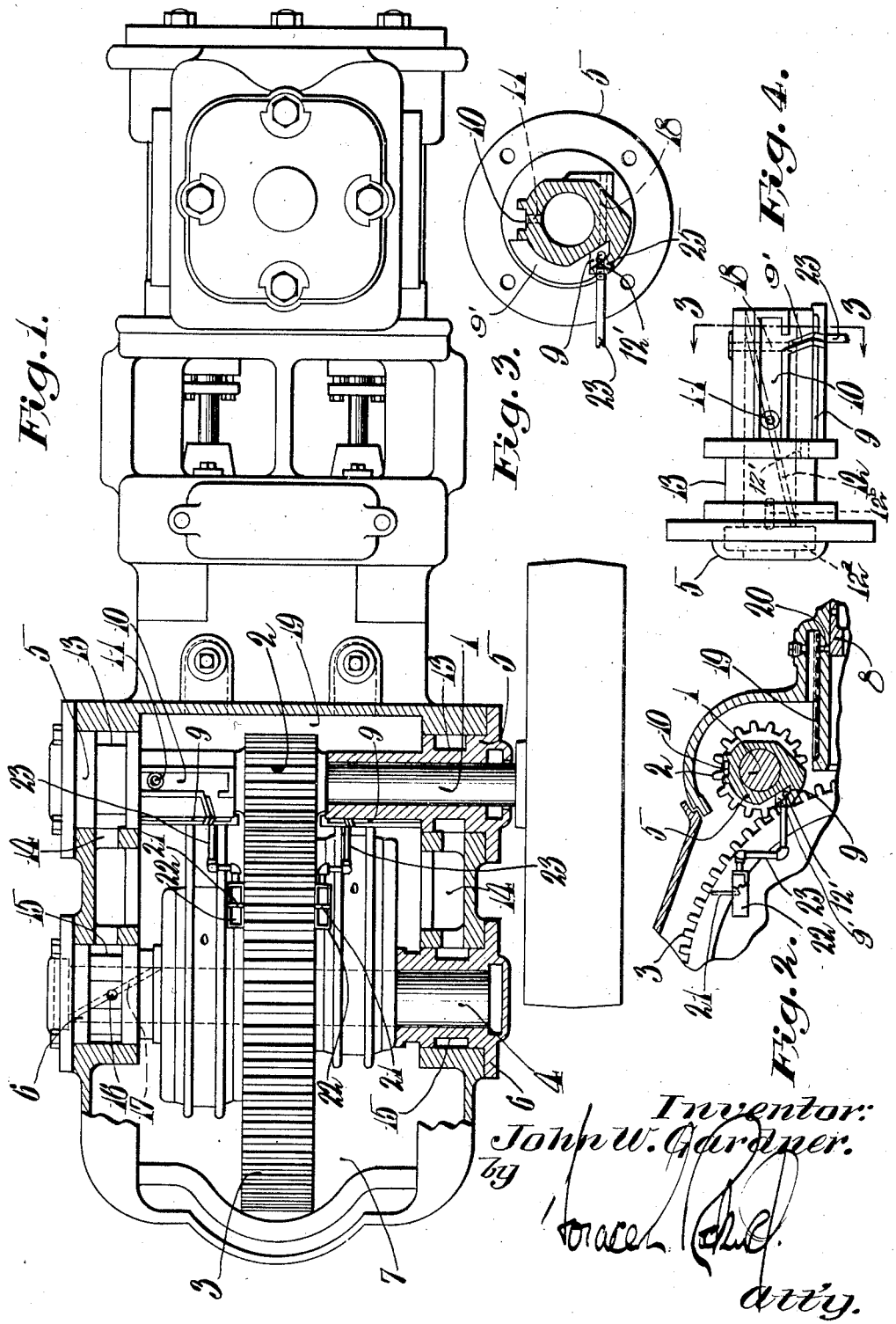
Inventor:
John W. Gardner.
by
Horace ???
atty.

Patented Aug. 14, 1928.

1,680,870

UNITED STATES PATENT OFFICE.

JOHN W. GARDNER, OF QUINCY, ILLINOIS, ASSIGNOR, BY MESNE ASSIGNMENTS, TO GARDNER-DENVER COMPANY, A CORPORATION OF DELAWARE.

LUBRICATING MECHANISM.

Application filed July 11, 1924. Serial No. 725,521.

My invention relates to lubricating mechanisms.

It has for its object to provide an improved automatic lubricating mechanism and more particularly such a mechanism especially adapted for use in connection with pumps or the like whereby the jack shaft bearings are effectually lubricated at the same time that a lubricant supply is maintained to the cross heads and to the main journal bearings, my present construction constituting a modified form of the invention described and claimed in my copending application Ser. No. 707,255, filed April 17, 1924, wherein improved cooperating lubricant intercepting means operative in either direction of rotation of the gearing are provided for supplementing the lubricant supplied to the intercepting and distributing means shown in that application.

In the accompanying drawings I have shown for purposes of illustration one form which my invention may assume in practice, illustrating the same in connection with a pump of the duplex type although it will, of course, be evident that it may be applied to other devices or to a pump having any desired number of cylinders.

In these drawings,—

Fig. 1 is a plan view of the pump partially in section to facilitate illustration.

Fig. 2 is a detail view partially in longitudinal section on line 2—2 of Fig. 1.

Fig. 3 is an enlarged detail view of a portion of Fig. 2.

Fig. 4 is a plan view of one of the jack shaft bearings.

In this illustrative construction I have shown a pump of the general construction described and claimed in my above mentioned application, the same including a suitable jack shaft 1 adapted to be driven by power and having a pinion 2 thereon meshing with a larger spur gear 3 located on a lower main shaft 4, the shafts 1 and 4 being journaled respectively on slip bearings 5 and 6 of my previously mentioned construction so that lubricant carried up by the dipping gear 3 from a suitable lubricant chamber 7 may be distributed to the jack shaft and main shaft bearings and also to the cross heads 8. More particularly, it will be noted that as in said application each bearing 5 has a suitable longitudinal trough 9 receiving lubricant squeezed out at one side between the gears 2 and 3 at the point of mesh thereof and leading to and extending under an upwardly extending and laterally inclined baffle 9' forming the entrance or mouth of a top trough 10 which in turn also receives some of the lubricant flowing from the pinion 2 and communicates through an opening 11 with grooves 12 for the jack shaft. Further each bearing 6 receives lubricant from passages 12 and 12' communicating with troughs 10 and 9, respectively, and communicating through an inner annular groove $12^a$ in the bearing bore and a bottom outlet $12^b$ therefor, in the case of the passages 12, and directly through the passage 12' in the case of the latter passage with an annular groove 13 in the bearing 5, a passage 14 in the frame, an annular groove 15 in the bearing 6, an opening 16 in that bearing, and grooves 17 leading from said opening to the shaft 4. Each bearing 5 is further provided with a passage 18 leading from the trough 9 to a reservoir 19 communicating through openings 20 with the cross heads 8.

In my improved construction it will be observed that I have provided a supplementary intercepting means adapted to deflect or separate lubricant from the gearing, herein from the dipping gear 3 as it is carried up by the rotation of the latter and to deliver this lubricant to augment the supply to the troughs 9. These separating means herein are in the form of a plurality of wiper type deflector or so called scraper mechanisms on opposite sides of the gear 3, each including a preferably vertically disposed wiper or scraper member 21 acting on lubricant on the side of the gear, preferably near its periphery, and herein carried, preferably centrally, in a suitable receptacle 22 which in turn is connected through pipe connections 23 with a suitable opening formed in the lip or lug 25 which forms the trough 9 on the slip bearing 5, these pipe connections herein being connected to the inner end of the member 5. Thus it will be noted that the lubricant carried up by the gear 3 will be separated from the latter by the action of the scraper 21 which, irrespective of the direction of the gear 3 or the speed thereof, will cause that lubricant to be supplied to the receptacle 22 and through the piping 23 to the trough 9 and from that trough through the opening 12' to the main journal bearings 6 to maintain the latter lubricated as desired. At the same time it will be noted that lubricant will be supplied through the openings 18 to the cross head reservoir means 19 and cross heads 8, while lubricant for the jack shaft bearings 5 will be collected in the trough 10 and distributed to those bearings as necessary, these bearings 5 also being connected as heretofore so that they likewise may supply the main and crosshead bearings.

As a result of my improved construction it will also be noted that all necessity for connecting the pipes 23 to reservoirs for the jack shaft bearings and using moving rings to supply the latter is eliminated, the collecting means including the scrapers being connectable directly to the bearing members and providing means adapted to produce an adequate supply of lubricant to the main bearings 6 independently of the supply of lubricant to the jack shaft bearings. Moreover, it will be evident that with my improved construction the jack shaft bearings 5 will also receive an adequate supply of lubricant forced out from between the meshing gears 2 and 3 into the troughs 9 and that this supply may be independent of that to the bearings 6. It will also be evident that the cross head lubricating means including the reservoir 19 may be supplied from either the pipe 23 or the lubricant squeezed out from between the teeth of the gears 2 and 3 since both communicate with the trough 9, the flow of lubricant either through the piping or from between the teeth of the gears being sufficient ordinarily to lubricate either the jack shaft bearings and the cross heads or the main journal bearings and the cross heads. However, in my present construction I prefer to allow a free intercommunication between the various sources of supply as shown herein, a maintained substantial flow of lubricant to the bearings being desirable and thus obtained when the main gear is rotating in either direction at any speed, the provision of the scraper mechanism especially enabling the desired supply of lubricant to be maintained irrespective of the direction of rotation of the main gear even when rotating at slow speed.

Attention is directed to the fact that in my improved construction it has been made possible to maintain the bearings 5 as slip bearings as in my previous application and to increase the flow of available lubricant as desired without substantial change, it only being necessary to screw in the piping 23 to the bearing members 5 after the latter have been inserted and to remove the collecting means and their connected pipe connections to enable free withdrawal of the slip bearings. These and other advantages of my improved construction will, however, be clearly apparent to those skilled in the art.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. The combination with an operating device having a plurality of bearings and meshing gearing journaled therein including a pinion and a gear meshing with the latter and rotating in an oil bath, of lubricating means including a trough and a deflector respectively collecting lubricant carried up on the working face and on a side of said gear as the latter rotates in the same direction, and common means for distributing said collected lubricant to said bearings.

2. The combination with an operating device having a plurality of bearings and meshing gearing journaled therein including a pinion and a gear meshing with the latter and rotating in an oil bath with its periphery substantially spaced laterally from the walls of the latter, of means including a trough and a deflector collecting lubricant respectively from adjacent the point of mesh of said gearing and from the side of said gear, and common means distributing said lubricant thus collected to lubricate said bearings.

3. The combination with an operating device having a plurality of bearings and meshing gearing journaled therein including a pinion and a gear meshing with the latter and rotating in an oil bath, of means operative in either direction of rotation of said dipping gear having devices for supplying lubricant to said bearings including a trough adjacent the point of mesh of said gears and a collector on the same side of said gear acting on the side of the latter.

4. In combination, an operating device having main and jack shaft bearings, meshing gearing including a gear rotating in an oil bath, and means for supplying lubricant to said bearings including a trough adjacent the point of mesh of said gears and a collector acting on the side of said dipping gear at a point above said trough.

5. The combination with an operating device having main and jack shaft bearings and meshing gearing having journals therein including a pinion and a gear meshing therewith and rotating in an oil bath, of means including a plurality of collecting devices at different points on the same side of said dipping gear, one of which acts on the lubricant while on said gear, for bringing together separate supplies of lubricant carried up by said gear and supplying said collected lubricant to said main and jack shaft bearings.

6. The combination with an operating device having main and jack shaft bearings and meshing gearing including a pinion and a gear meshing therewith and rotating in a lubricant bath, of means for distributing lubricant to said bearings including a receptacle adjacent the point of mesh of said gearing and communicating with said bearings, and a supplemental deflector collector adjacent the periphery of said dipping gear and delivering to said receptacle in either direction of rotation of said gear.

7. In combination, an operating device having a lubricating bearing member and a member rotating in an oil bath, and means for lubricating said bearing member from said rotating member including a lubricant collecting lip on said bearing member and supplemental deflector means acting on a surface of said rotating member and carried by said bearing member and delivering to said lip.

8. In combination, an operating device having a lubricating slip bearing and a member rotating in an oil bath, and means for lubricating said bearing from said rotating member including deflector means acting on a surface of said rotating member and carried by said slip bearing and removably connected thereto to permit withdrawal thereof.

9. In combination, an operating device having main and jack shafts, and lubricating means therefor comprising intercommunicating lubricating slip bearing members, meshing gearing on said shafts including a gear rotating in an oil bath, and lubricant collecting deflector means acting on said gear and delivering to one of said bearings.

10. In combination, an operating device having a plurality of bearings and a member rotating in an oil bath, and means for lubricating said plurality of bearings including a lubricant receiving trough means carried by one of said bearings and receiving lubricant from said member, and supplemental lubricant collecting deflector means acting on said member and likewise carried by one of said bearings.

11. The combination with an operating device having a plurality of bearings and a plurality of meshing gears having journals therein, one of said gears dipping into an oil bath while the other does not, of lubricant distributing means for said bearings including lubricant receiving trough means carried by a bearing of said last mentioned gear and receiving lubricant carried up by said dipping gear and supplemental lubricant intercepting deflector means acting on said dipping gear and delivering to said trough means.

12. In combination, an operating device having main and jack shaft bearings and a member rotating in an oil bath, lubricant receiving trough means communicating with a bearing of one shaft, and a single supplemental lubricant intercepting deflector means communicating with bearings of both shafts and operative in either direction of rotation of said member, each of said means intercepting lubricant carried up by said member.

13. In combination, an operating device having main and jack shaft bearings and a member rotating in an oil bath, lubricant receiving trough means communicating with bearings of both shafts, and supplemental lubricant intercepting deflector means communicating with a bearing of one shaft and operative in either direction of rotation of said member, each of said means intercepting lubricant carried up by said member.

14. In combination, an operating device having main and jack shaft bearings and meshing gearing including a gear rotating in an oil bath, lubricant receiving trough means communicating with a bearing of each shaft, and supplemental lubricant intercepting deflector means communicating with a bearing of each shaft and operative in either direction of rotation of said gearing, each of said means intercepting lubricant carried up by said gear.

15. In combination, an operating device having main and jack shafts, a cross head, bearings for said shafts and cross head, and meshing gearing including a member rotating in an oil bath, lubricant receiving trough means communicating with certain of said bearings, and supplemental lubricant intercepting deflector means communicating with the others of the same and operative in either direction of rotation of said gearing, each of said intercepting means intercepting lubricant carried up by said member.

16. In combination, an operating device having a plurality of bearings, meshing gearing including a gear rotating in an oil bath, means for collecting lubricant from adjacent the point of mesh of said gearing and distributing it to said bearings, and supplemental means operative in either direction of rotation of said gear whereby distribution is maintained irrespective of the direction of rotation of said gear.

17. In combination, an operating device having main and jack shaft bearings, meshing gearing including a gear rotating in an oil bath, means for collecting lubricant from adjacent the point of mesh of said gearing and distributing it to both bearings, and supplemental means operative in either direction of rotation of said gear maintaining a flow of lubricant to said bearings irrespective of the direction of rotation of said gearing.

18. In combination, an operating device having main and jack shaft bearings and a crosshead, meshing gearing including a gear rotating in an oil bath, means for collecting lubricant from adjacent the point of mesh of said gearing and distributing it to said bearings and crosshead, and supplemental means operative in either direction of rotation of said gear whereby distribution is maintained irrespective of the direction of rotation of said gear.

19. In combination, an operating device having main and jack shaft bearings and a crosshead, meshing gearing including a gear rotating in an oil bath, means for collecting lubricant from adjacent the point of mesh of said gearing, a deflector acting on the surface of said gear, and means whereby said means and said deflector may each supply lubricant to said bearings and said crosshead.

20. In combination, meshing gearing including a gear rotating in an oil bath, bearings therefor, lubricating means for certain of said bearings including a collecting element collecting lubricant adjacent the line of mesh of said gearing and delivering to said lubricating means, and supplemental means including a deflector acting on lubricant on one of the elements of said gearing and operative to supply lubricant to said lubricating means in either direction of rotation of said gearing.

21. In combination, meshing gearing including a gear rotating in an oil bath, bearings therefor, lubricating means for certain of said bearings including a collecting element collecting lubricant adjacent the line of mesh of said gearing and delivering to said lubricating means, and supplemental means including a deflector acting on lubricant on one of the elements of said gearing and operative to supply lubricant to said lubricating means in either direction or irrespective of the speed of rotation of said gearing.

22. In combination, meshing gearing including a gear rotating in an oil bath, bearings therefor, lubricating means for certain of said bearings including a collecting trough collecting lubricant as it is squeezed out between the teeth of said gearing and delivering to said lubricating means, and supplemental means including a vertically disposed deflector acting on lubricant on the side of one of the elements of said gearing and operative to supply lubricant to said lubricating means in either direction of rotation of said gearing.

23. In combination, meshing gearing including a gear rotating in an oil bath, bearings therefor, lubricating means for certain of said bearings including a collecting trough collecting lubricant as it is squeezed out between the teeth of said gearing and delivering to said lubricating means, and supplemental means including a vertically disposed deflector acting on lubricant on the side of one of the elements of said gearing and operative to supply lubricant to said lubricating means in either direction or irrespective of the speed of rotation of said gearing.

24. In combination, meshing gearing including a gear dipping in an oil bath, bearings therefor, lubricant collecting means collecting lubricant adjacent the point of mesh of said gearing, supplemental collecting means including a deflector acting on lubricant on the side of one of the elements of said gearing and operative to collect lubricant in either direction of rotation of said gearing, and bearing lubricating passage means leading to bearings of the different elements of said gearing so disposed as to enable said different collecting means jointly to lubricate said bearings.

25. In combination, meshing gearing including a gear dipping in an oil bath, bearings therefor, lubricant collecting means collecting lubricant adjacent the point of mesh of said gearing, and supplemental collecting means including a deflector acting on lubricant on the side of one of the elements of said gearing and operative to collect lubricant in either direction of rotation of said gearing, and bearing lubricating passage means leading to bearings of the different elements of said gearing so disposed as to enable said different collecting means jointly to lubricate said bearings, with certain of said passage means common to both of said collecting means.

26. In combination, meshing gearing including a gear dipping in an oil bath, bearings therefor, lubricant collecting means collecting lubricant adjacent the point of mesh of said gearing, and supplemental collecting means including a deflector acting on lubricant on the side of one of the elements of said gearing and operative to collect lubricant irrespective of the speed or in either direction of rotation of said gearing, and bearing lubricating passage means leading to bearings of the different elements of said gearing so disposed as to enable said different collecting means jointly to lubricate said bearings, with certain of said passage means common to both of said collecting means.

27. The combination with a plurality of longitudinally spaced shafts, gearing rotatable by one of the same and including a gear carried by another and dipping in an oil bath and a non-dipping gear meshing with said dipping gear, and bearings for each shaft on opposite sides of said gearing, of means above the axis of the dipping gear acting on lubricant carried up on the periphery of said gear and separating lubricant therefrom, and stationary means receiving said separated lubricant and distributing it to the bearings of both shafts.

28. The combination with a plurality of longitudinally spaced shafts, gearing rotatable by one of the same and including a gear carried by another and dipping in an oil bath and a non-dipping gear meshing with said dipping gear, bearings for each shaft on opposite sides of said gearing, and a crosshead operatively connected for rotation by said dipping gear, of means above the axis of the dipping gear acting on lubricant carried up on the periphery of said gear and separating lubricant therefrom, and stationary means receiving said separated lubricant and distributing it to the bearings of both shafts and to said crosshead.

29. The combination with a plurality of longitudinally spaced shafts, gearing rotatable by one of the same and including a gear carried by another and dipping in an oil bath and a non-dipping gear meshing with said dipping gear, bearings for each shaft on opposite sides of said gearing, and a crosshead operatively connected for rotation by said dipping gear, of means operative in either direction of rotation of said gearing above the axis of the dipping gear acting on lubricant carried up on the periphery of said gear and separating lubricant therefrom, and stationary means operative in either direction of rotation of the gearing receiving said separated lubricant and distributing it to the bearings of both shafts and to said crosshead.

30. The combination with a gear casing having a lubricant bath, gearing therein, including a dipping gear and a meshing non-dipping gear, shafts for said gears, and slip bearings for said shafts, of stationary means for lubricating a bearing of each shaft with lubricant carried up by said dipping gear including a wiper carried by the bearing for said non-dipping gear and disposed adjacent said gearing and operative in either direction of rotation of said gearing to collect lubricant from one of the elements of said gearing.

31. In combination, an operating device having main and jack shaft bearings and meshing gearing including a gear rotating in an oil bath, lubricant receiving means receiving lubricant carried up by said gear and communicating with one of said bearings, and supplemental lubricant receiving means communicating with the other bearing, said last mentioned means including a deflector disposed adjacent the periphery of said dipping gear and connected piping connected to said jack shaft bearing.

32. In combination, an operating device having main and jack shaft bearings and meshing gearing including a gear rotating in an oil bath, lubricant receiving means receiving the lubricant carried up by said gear and communicating with one of said bearings, and supplemental lubricant receiving means communicating with the other bearing, said first mentioned means including a trough receiving lubricant squeezed out between said gears and said last mentioned means including a deflector disposed adjacent the periphery of said dipping gear and connected piping connected to said jack shaft bearing.

In testimony whereof I affix my signature.

JOHN W. GARDNER.